April 22, 1952     R. G. LE TOURNEAU     2,593,465
MOBILE FORM AND TRANSPORT FOR CAST STRUCTURES
Filed May 17, 1946     7 Sheets-Sheet 1

INVENTOR
R. G. LeTourneau
ATTORNEYS

April 22, 1952 R. G. LE TOURNEAU 2,593,465
MOBILE FORM AND TRANSPORT FOR CAST STRUCTURES
Filed May 17, 1946 7 Sheets-Sheet 2

INVENTOR
R. G. LeTourneau
ATTORNEYS

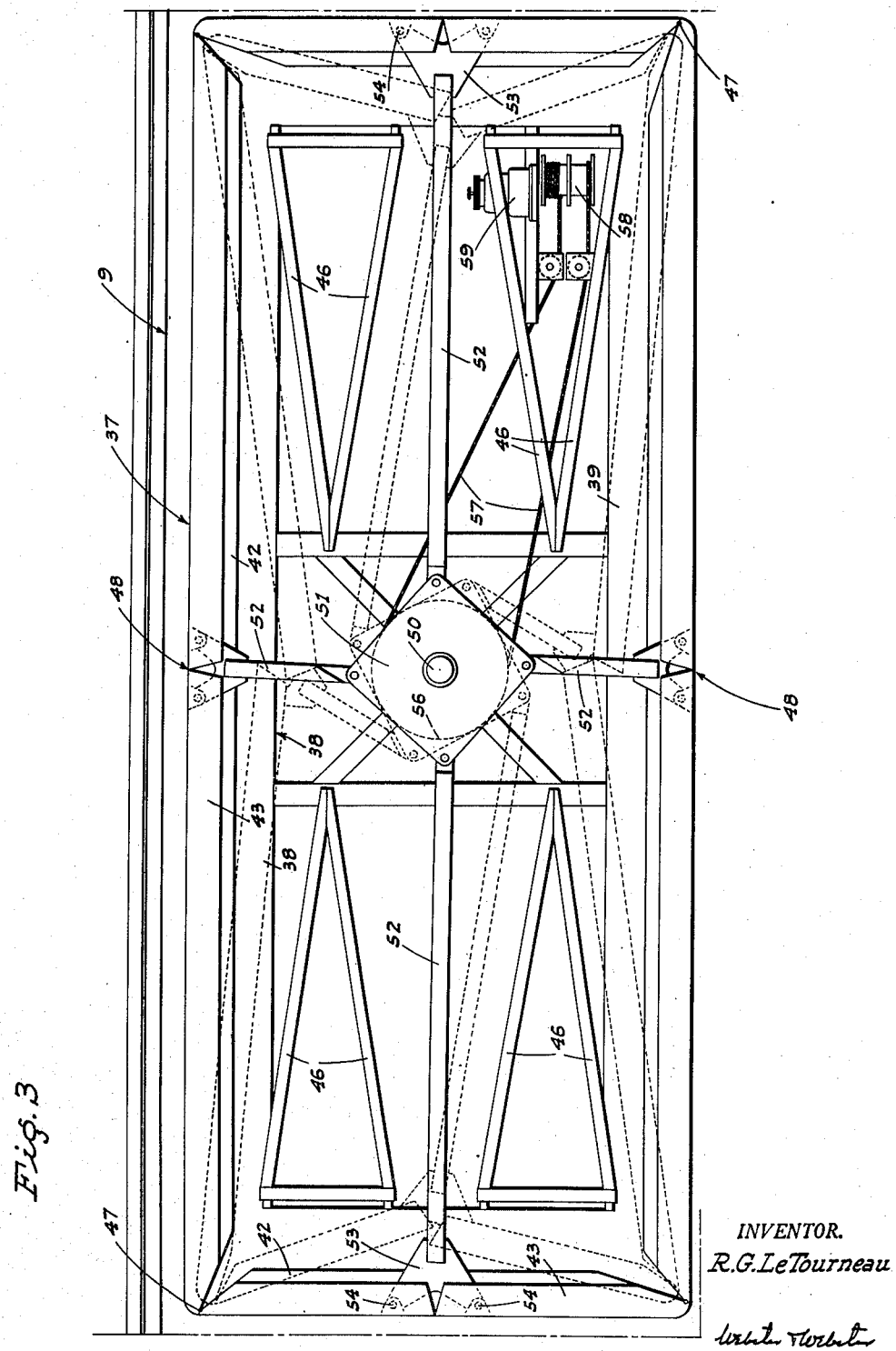

April 22, 1952 R. G. LE TOURNEAU 2,593,465
MOBILE FORM AND TRANSPORT FOR CAST STRUCTURES
Filed May 17, 1946 7 Sheets-Sheet 4
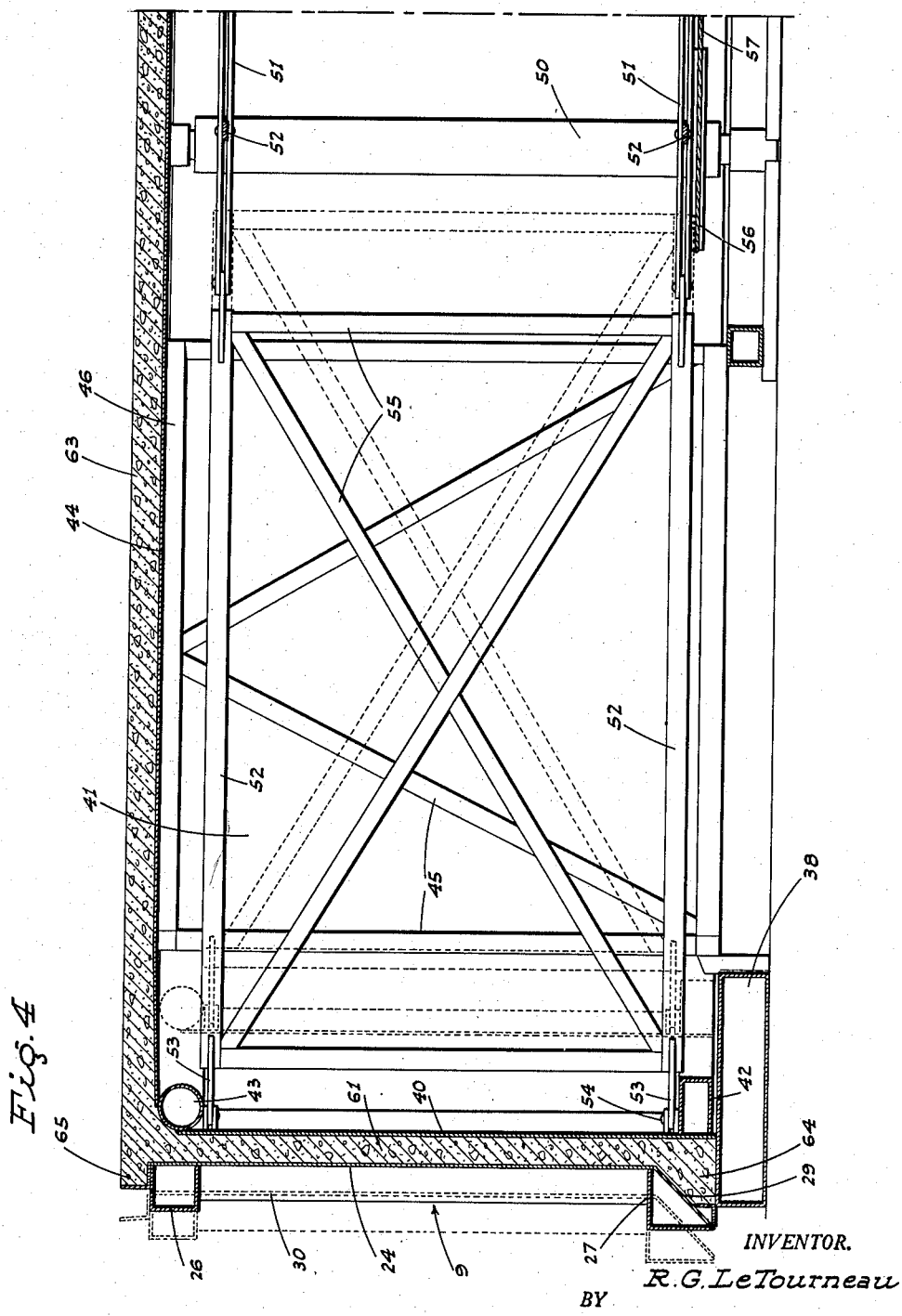
INVENTOR.
R.G.LeTourneau
BY
ATTYS April 22, 1952     R. G. LE TOURNEAU     2,593,465
MOBILE FORM AND TRANSPORT FOR CAST STRUCTURES
Filed May 17, 1946     7 Sheets-Sheet 5
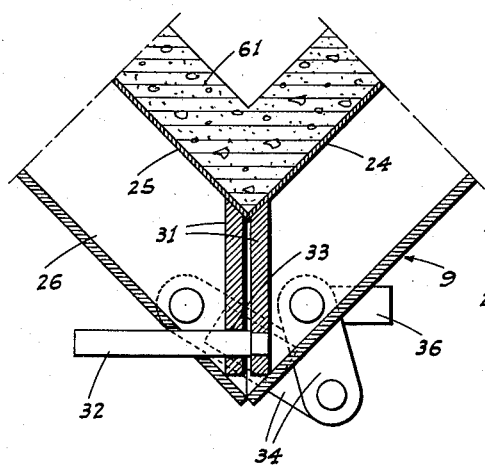
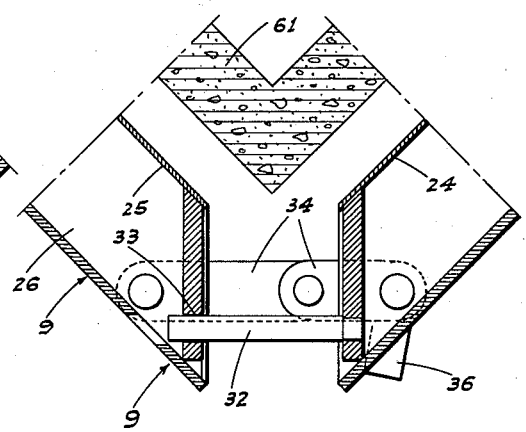
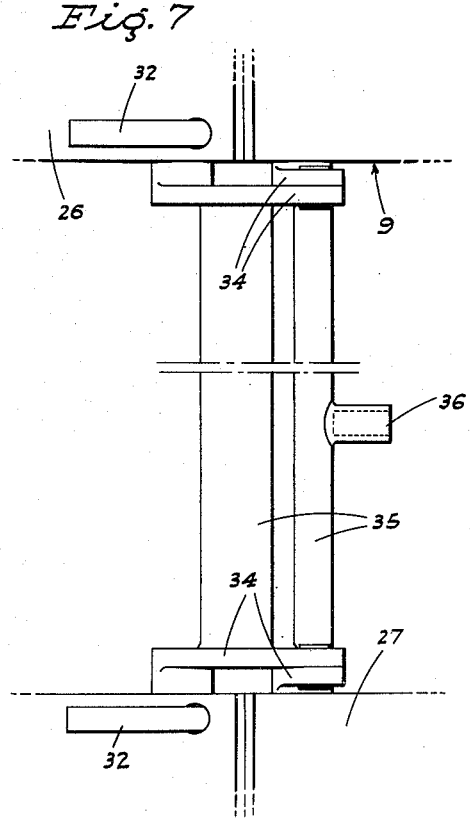
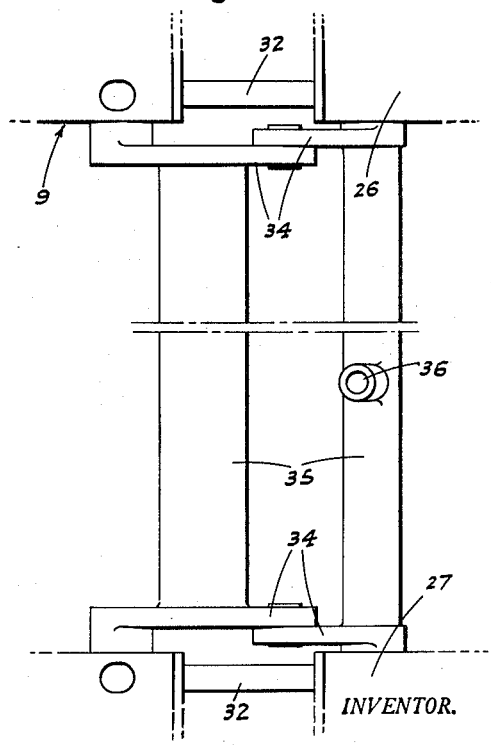
INVENTOR.
R. G. LeTourneau
BY
ATTYS April 22, 1952 R. G. LE TOURNEAU 2,593,465
MOBILE FORM AND TRANSPORT FOR CAST STRUCTURES
Filed May 17, 1946 7 Sheets-Sheet 6

INVENTOR.
R. G. LeTourneau
BY
ATTYS

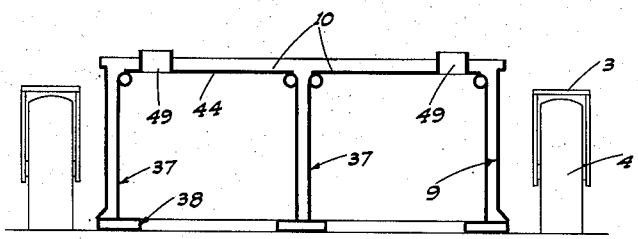
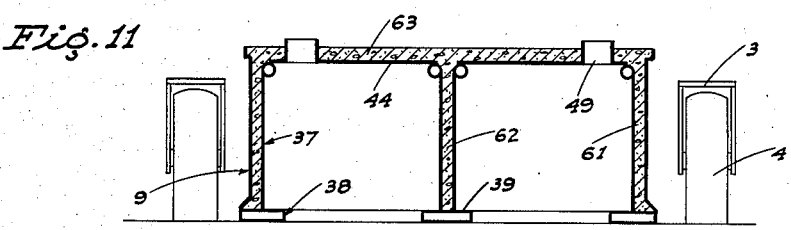
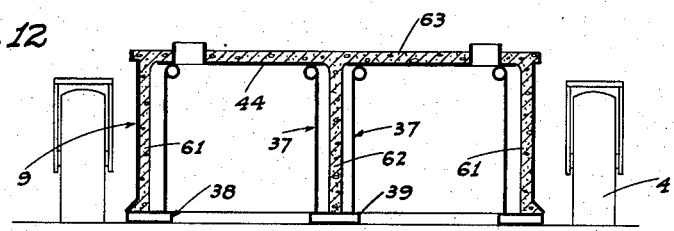
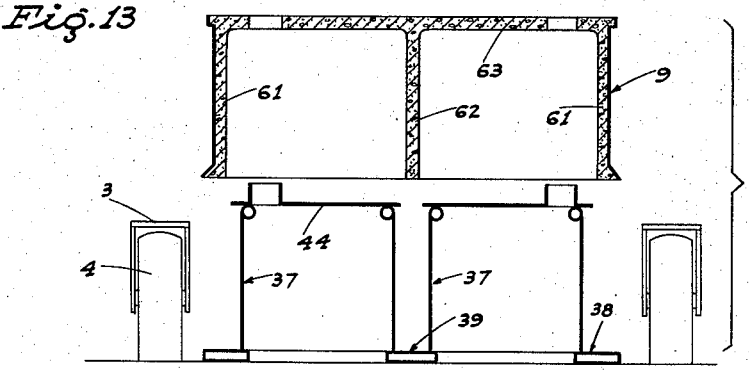
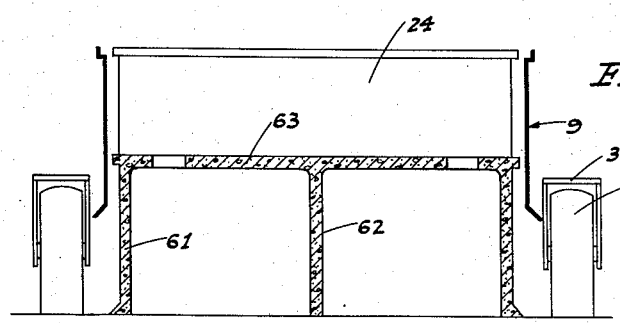
INVENTOR.
R. G. LeTourneau Patented Apr. 22, 1952

2,593,465

UNITED STATES PATENT OFFICE 2,593,465

MOBILE FORM AND TRANSPORT FOR CAST STRUCTURES

Robert G. Le Tourneau, Peoria, Ill., assignor to R. G. LeTourneau, Inc., Stockton, Calif., a corporation of California Application May 17, 1946, Serial No. 670,503

7 Claims. (Cl. 214—75)

This invention relates to, and it is an object to provide, a novel house form and transport assembly for use in the construction of reinforced concrete, monolithic houses.

A further object of the invention is to provide a tractor propelled, wheel supported yoke, of heavy-duty construction, which straddles the outer form from one end thereof, and from which yoke such outer form is suspended for substantial vertical adjustment whereby to lift the outer form—with the house therein—clear of the ground for transport to the location where the house is to be placed. At such location, the outer form and house are lowered onto the ground, whereupon said outer form is expanded and lifted clear of the house.

An additional object of the invention is to provide, in a house form assembly as in the preceding paragraph, a novel, power-actuated, multiple-point, suspension arrangement for the outer form; such suspension arrangement being operative to provide independent leveling of the outer form at said points, and to shift said form laterally or lengthwise of the supporting yoke for balance during transport and for accurate placement of the house on a predetermined site.

Another object of the invention is to arrange the tractor-propelled yoke so that it may be used, in the manner described, selectively with a number of inner and outer form assemblies, whereby a like number of houses may be constructed at the same time but using just one of said tractor-propelled yokes. For limited moves from one site to another the tractor-propelled yoke also serves to transport each inner and outer form assembly between said sites; the forms then being secured together as a unit. For transport by rail the major parts of each inner and outer form assembly and the tractor-propelled yoke are capable of being dismantled for loading on a railroad car.

A further object of the invention is to provide a practical house form assembly, and one which will be exceedingly effective for the purpose for which it is designed.

These objects are accomplished by means of such structure and relative arrangement of parts as will fully appear by a perusal of the following specification and claims.

In the drawings:

Fig. 3 is a top plan view of one inner form section with the roof plate removed; said inner form section being shown in its working position in full lines, and in its retracted position in dotted lines.

Fig. 4 is a fragmentary longitudinal section of the house form assembly with a house poured therein.

Fig. 5 is a fragmentary sectional plan showing one of the expanding corners of the outer form in closed position.

Fig. 6 is a similar view but shows said one expanding corner as open or expanded.

Fig. 7 is a fragmentary side elevation of said one expanding corner of the outer form, in the closed position as in Fig. 5.

Fig. 8 is a view similar to Fig. 7, but shows said one expanding corner open as in Fig. 6.

Figure 1:
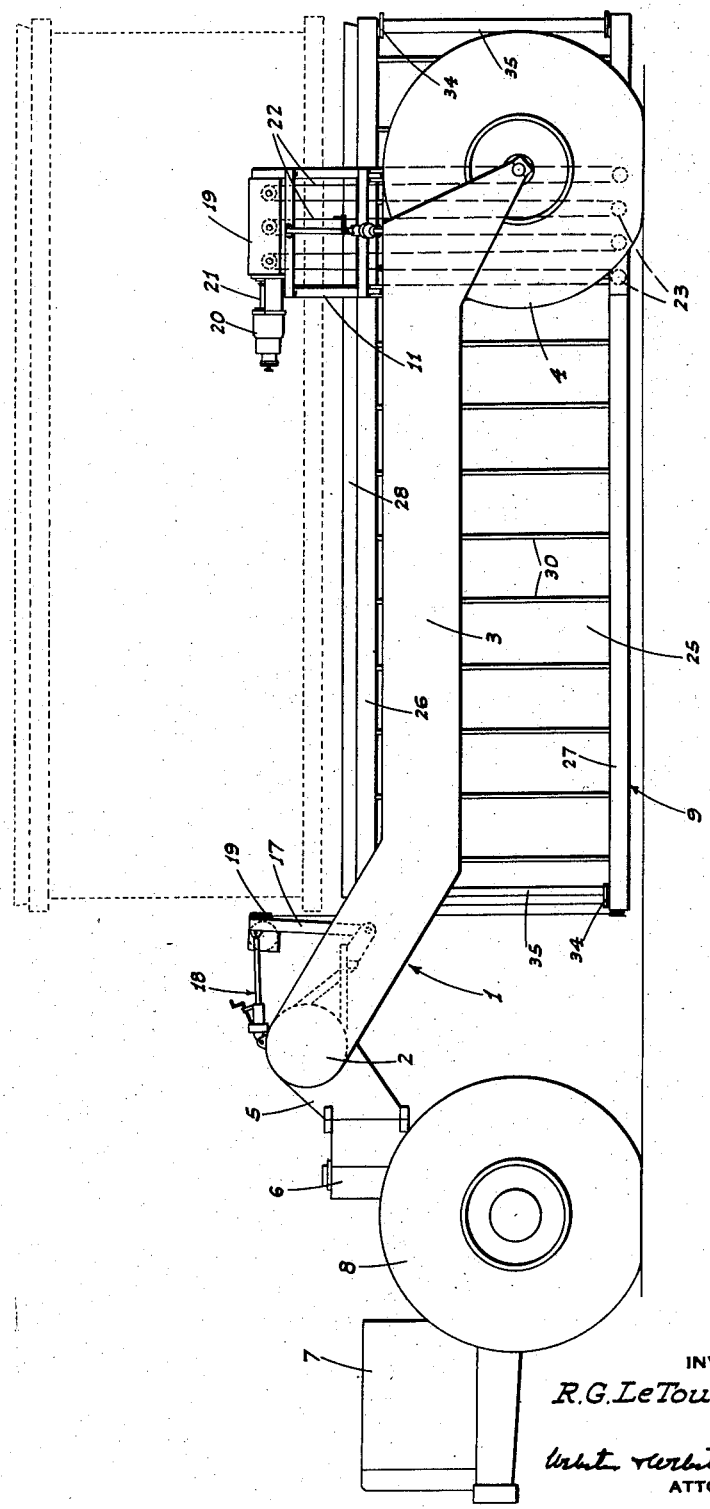
Fig. 1 is a side elevation of the house form assembly; the outer form being shown in lowered position in full lines, and in raised position in dotted lines.

Figs. 10-14 inclusive are a series of diagrams illustrating the sequential steps of pouring, transporting, and setting a monolithic house by means of the house form assembly which is the subject of the present invention.

Referring now more particularly to the characters of reference on the drawings, the house form assembly comprises a longitudinally extending, heavy-duty yoke 1 which includes a cross beam 2 at its forward end and transversely spaced side beams 3 projecting rearwardly from the ends of said cross beam. At their rear ends the side beams 3 of the yoke are supported by large, pneumatic-tired wheels 4. Centrally of its ends the cross beam 2 of the yoke is fitted with a rigid, forwardly projecting neck 5 which is coupled to an upstanding power steering unit 6 mounted on the rear deck of a two-wheel tractor 7, which includes transversely spaced supporting and drive wheels 8. This two-wheel tractor 7 is of the "Tournapull" type.

The yoke 1 straddles an upstanding outer form, indicated generally at 9, from the front end thereof, and which outer form is rectangular and open top and bottom. The outer form 9 normally surrounds an inner form, indicated generally at 10, in adjacent but spaced relation; said outer and inner forms being hereinafter described in detail.

The outer form 9 is suspended from the yoke 1, at multiple points, for substantial selective and independent vertical adjustment at said points by means of the following mechanism:

Upstanding swing frames 11 are pivotally mounted, as at 12, on the side beams 3 adjacent the rear ends thereof for lateral swinging movement; such lateral swinging movement being controlled by diagonally disposed guy-bar units 13 pivotally connected between the swing frames 11 adjacent their upper ends, as at 14, and laterally outward points on the side beams 3, as at 15. The guy-bar units are adjustable as to length by hand cranks 16.

Another swing frame 17 is similarly mounted in connection with the cross beam 2 centrally of its ends, but is mounted for swinging movement lengthwise of the yoke; such swinging movement being controlled by an adjustable guy-bar unit 18 of the same type as the guy-bar unit 13.

The swing frames 11 and 17 are each fitted, at the top, with a swingably suspended, multiple-sheave block 19, and an electric power winch 20 is mounted on each of said swing frames adjacent one end of the sheave block 19. Each electric winch 20 has a normally set brake which automatically releases when the winch is actuated. A cable 22 leads from the drum 21 of each electric winch and is thence reeved back and forth between the sheaves of the adjacent block 19 and corresponding, substantially vertically alined sheaves 23 mounted on the outer form 9 adjacent the bottom thereof. The outer form 9 is thus suspended centrally at the front, and on opposite sides adjacent the rear, by separate block and tackle systems 22 selectively operable by the independent electric winches 20. By simultaneous operation of said electric winches the three block and tackle systems 22 can be actuated in a direction to cause raising of the outer form 9 from the lowered position shown in full lines in Fig. 1 to the elevated position shown in dotted lines in said figure.

The electric winches 20 are selectively and independently controlled by the operator of the tractor 7 through the medium of a control circuit (not shown), and which circuit is energized by a generator mounted on the tractor and driven by the engine thereof.

The outer form 9 is constructed, in detail, as follows:

Such outer form 9 comprises upstanding rectangular end walls 24, and upstanding rectangular but elongated side walls 25. The end walls 24 and side walls 25 each comprise a separate unit which includes a horizontal box beam 26 adjacent the top, and a horizontal box beam 27 adjacent the bottom, of the wall. The box beam 26 is disposed short of the upper edge of the corresponding wall, and above said box beam the wall is laterally outwardly offset, as at 28. The bottom of the lower box beam 27 on each wall is flared laterally outwardly and downwardly, as at 29. The sheaves 23 are affixed to the lower box beam 27.

The walls 24 and 25 each include vertical strengthening ribs 30 fixed thereto on the outside and extending between the box beams 26 and 27, as shown. At adjacent ends of the walls 24 and 25 the box beams 26 and 27 are mitered on a 45° angle and fitted on said miter with vertical end plates 31, which end plates are normally in closely adjacent face to face relation when the outer form is contracted, and as shown in Fig. 5. One of each adjacent pair of end plates 31 is fitted with a rigid guide pin 32 which extends at right angles from said plate in slidable and guiding relation through an opening 33 in the adjacent end plate, whereby when the outer form 9 is expanded, as hereinafter described, the walls 24 and 25 remain in symmetrical right-angle relation to each other.

The above described outer form 9 is normally closed with the ends of the walls 24 and 25, as well as the end plates 31, in substantially abutting relation.

A pair of links 34, pivotally connected at adjacent ends, are pivoted in connection with, and extend between, adjacent mitered end portions of the upper box beams 26 and lower box beams 27; said pairs of links normally being broken or folded outwardly, as shown in Fig. 5, and adjacent upper and lower pairs of said links are disposed in parallelism, corresponding links of said adjacent pairs being connected together by vertical posts 35. One of the posts 35 is fitted with a laterally projecting boss 36 onto which a pipe or other member is adapted to be removably secured as a lever. By means of such a lever on the boss 36, the corresponding post 35 may be rotated in a direction to straighten out the links 34, and when this occurs the walls 24 and 25 are forced apart at adjacent ends, causing said walls to move laterally outwardly to the position shown in Fig. 6, which results in expansion of the outer form.

The inner form 10 is constructed, in the present embodiment, of a pair of elongated box-like form sections, each of which is indicated generally at 37, disposed in adjacent, parallel, but slightly spaced-apart relation, and supported by an open rectangular base 38 which includes a center strip 39. Said rectangular base 38, together with its center strip 39, is relatively wide on top, and is of a size and configuration such that it extends both laterally outwardly and inwardly of the supported inner form sections 37 at all points. Each of the box-like form sections 37 of the inner form 10 is of identical construction, and therefore a description of one will suffice for both.

Each form section 37 comprises upstanding rectangular end walls 40 and side walls 41, each of which is fitted adjacent the bottom with a horizontal lower box beam 42, and at the top with a horizontal tubular beam 43. The end walls 40 and side walls 41 are affixed to the tubular top beams 43 on the outside thereof some distance short of the top of said beams, whereby the intervening portion provides a rounded part of the form which shapes the ceiling cove in the house.

A one-piece ceiling or roof plate 44 rests at its edges in slidable relation on top of the tubular beams 43; said roof plate being rigidly supported from the base 38 by upstanding frames 45 which include horizontal supporting members 46 which engage and are affixed to the roof plate 44 from beneath.

The end walls 40 and side walls 41 are vertically hinged together at adjacent ends, as at 47, and centrally of their ends said end walls 40 and side walls 41 are vertically divided or separated to form divided ends, as at 48. Adjacent ends of the lower box beams 42 and tubular top beams 43 are mitered adjacent the hinge points 47 and the divided points 48, whereby to permit of collapsing of the form section 37 without interference. Access to the interior of each form section 37 is gained through a manhole 49 in the roof plate 44.

The power actuated mechanism which is employed to collapse each inner form section 37 is disposed therein and comprises an upstanding center post 50 having rectangular actuator plates 51 affixed axially thereto adjacent top and bottom; the corners of the actuator plates 51 normally pointing directly toward corresponding ends and sides of the form section. Top and bottom actuator bars 52 are pivotally connected with the corners of corresponding actuator plates 51 and extend horizontally toward corresponding divided ends of the end walls 40 and side walls 41. Adjacent said divided ends the actuator bars 52 are each fitted with a V-shaped attachment plate 53 which spans said divided ends and is pivotally connected thereto, as at 54. Corresponding upper and lower actuator bars 52 are secured together by a connecting frame 55.

The center post 50 is adapted to be power rotated by means of a drum or pulley 56 thereon driven by a cable system 57, which in turn is operated from a double drum 58 of an electric power winch 59 mounted in connection with the base 38 within the form section 37.

Figure 2:
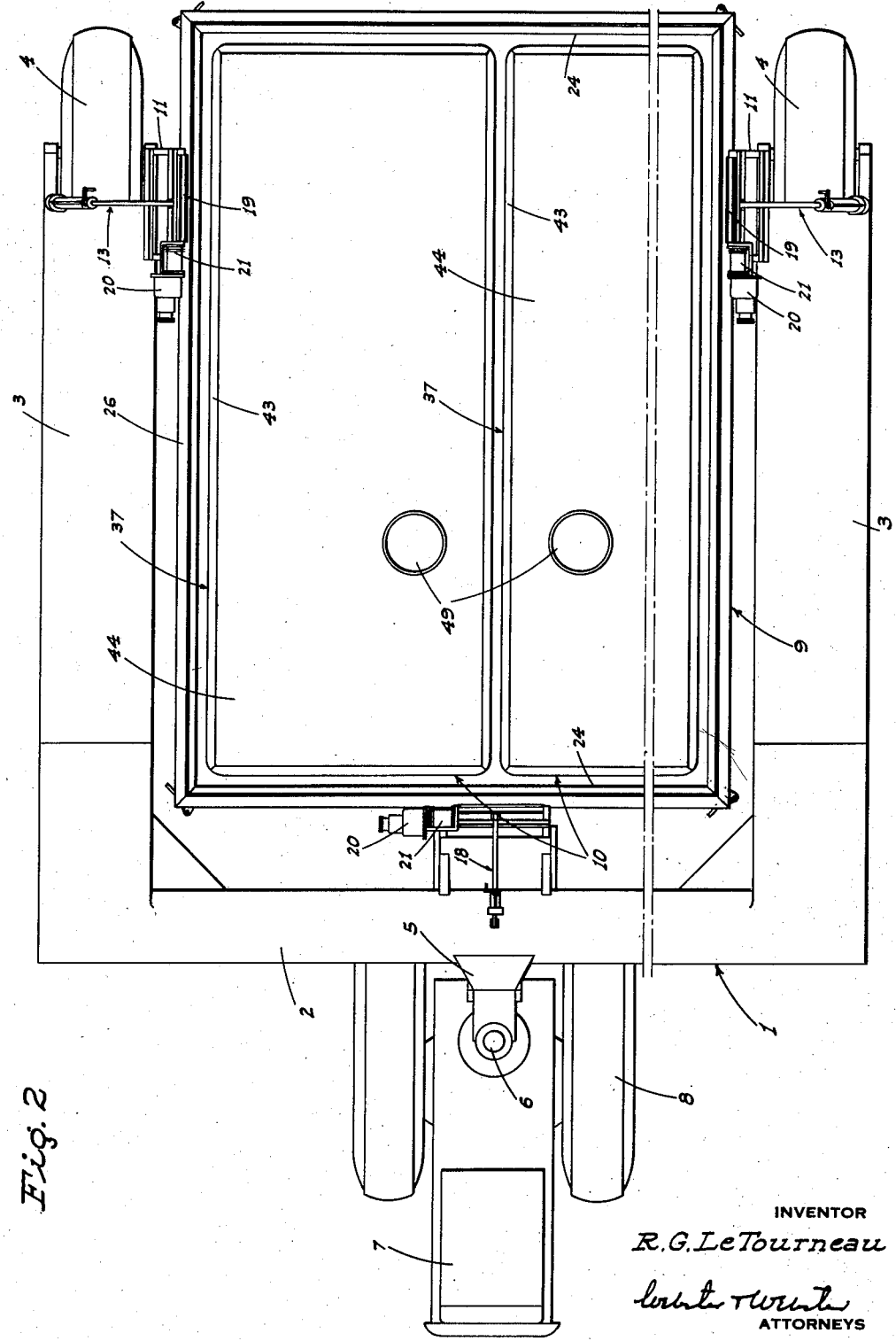
Fig. 2 is a plan view of the house form assembly before pouring of a house therein.
Figure 9:
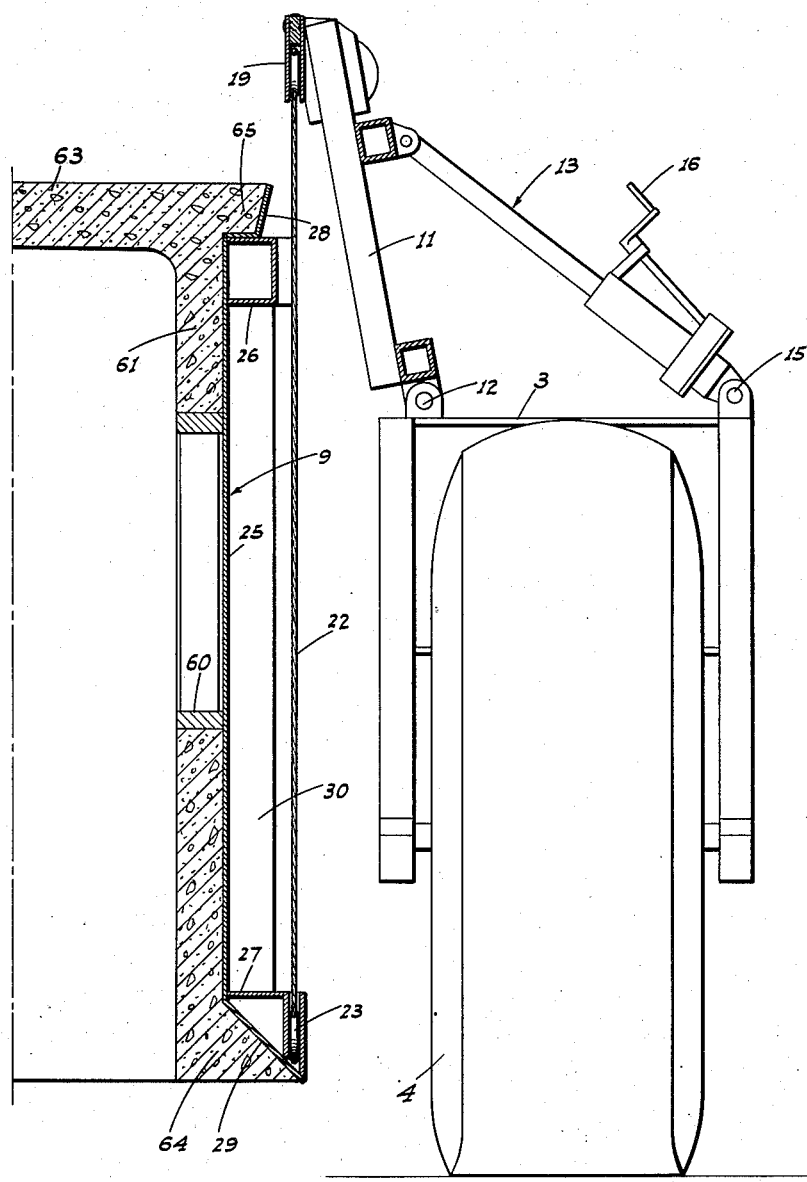
Fig. 9 is a fragmentary transverse section showing one lifting cable system as supporting an adjacent portion of the outer form, with a poured and set house supported in said outer form for transport.

When the described house form assembly is in use the base 38 is positioned on the ground, and the two box-like form sections 37 which comprise the inner form 10 are seated on said base in the adjacent but spaced-apart positions as shown, for example, in Fig. 2; said sections 37 then being non-contracted, as shown in full lines in Fig. 3. Thereafter, and before the outer form 9 is brought into position, reinforcing steel or mesh is applied to the form sections 37 exteriorly thereof, together with electric conduits and related parts which are to be embedded in the walls of the house. Also, window and door forms are applied to the outside of the sections 37 at approximate points; a window form being shown at 60 in Fig. 9. The window and door forms are secured to the sections 37 by bolts which extend from within the latter, and which bolts are removed before said sections are contracted.

After application of the reinforcing steel and conduits to the sections 37, and the placement of the window and door forms thereon, the yoke 1, with the outer form 9 in raised position, is backed in straddling relation to the inner form 10. Then the outer form 9 is lowered to a position in symmetrical surrounding relation to said inner form 10, and until the lower edges of the end walls 24 and side walls 25 substantially abut the top of the base 38. The outer form 9 is positioned so that the space between the inner and outer forms is substantially equal at all points, with the window and door frames engaging on opposite sides with corresponding forms. The house form assembly is then ready to be poured, as shown diagrammatically in Fig. 10, and the mix is poured between the outer and inner forms 9 and 10, respectively, from above.

After the mix is poured between the outer and inner forms to form the walls 61 of the house, including a partition 62 poured between the sections 37, the roof 63 is poured, with the exception of the manholes 49, which include suitable upstanding collars thereon. After the roof 63 is poured and finished on top, which roof can be given any desired slope for drainage, the monolithic house as cast or poured in the house form assembly, as shown diagrammatically in Fig. 11, is permitted to set.

As cast, the house is formed about its lower edge with an enlarged beveled footing 64, and at its upper edge with an outwardly projecting cornice 65. When the monolithic house has set in the house form assembly the form sections 37 are each contracted. This contraction of each form section 37 is accomplished by operation of the electric power winch 59 in a direction to rotate the center post 50 and actuator plates 51 so as to pull inwardly on the actuator bars 52. When this occurs the divided end and side walls 40 and 41 buckle inwardly at their divided ends, as shown in dotted lines in Fig. 3, whereupon said walls tend to fold inwardly at adjacent corners and so that said walls—as an assembly—contract, freeing the same from corresponding walls 61 of the house. By reason of the described manner of contracting the form sections 37, one of the divided ends 48 of each pair thereof moves inwardly to greater extent than the other, whereby to prevent interference between the same during the buckling operation.

Upon occurrence of the above described contracting of each form section, the box beams 42 and tubular top beams 43 of the end walls 40 and 41 slide inwardly relative to the base 38 and roof plate 44. The contraction of the form sections 37 is shown diagrammatically in Fig. 12.

The next step in the operation is raising of the outer form 9 with the house remaining therein to an elevated position above the contracted inner form sections 37, as shown diagrammatically in Fig. 13. Thereafter, the tractor 7 is operated to move the yoke 1 forwardly until the outer form 9 and included house is clear of the inner form. When clear of the inner form the outer form is lowered to adjacent the ground for transport, and thereafter the tractor travels with the yoke 1 and suspended outer form 9, with the house in the latter, to the site where the house is to be placed.

At such site the tractor 7 and yoke 3 are maneuvered until the outer form and house are substantially in the desired position for setting of the house; any fine adjustment of lateral or longitudinal position of the outer form 9 being accomplished by adjustment of the upstanding swing frames 11 and 17.

The next step is lowering of the outer form and house, by the block and tackle systems 22, onto the ground, and thereafter the outer form 9 is expanded in the manner hereinbefore described; i. e. by operation of the link pairs 34 by means of a lever on the respective bosses 36. The expansion of the outer form 9 is sufficient to wholly clear the same from the house, and as so expanded the outer form is raised, as shown diagrammatically in Fig. 14, to a position above the house, and the yoke 3 is then moved forward to wholly clear said house, at which time the outer form is again lowered to a transport position.

As so formed the house includes, in monolithic form, side and end walls, a roof, and a central partition running full length of the house. The house is provided with any suitable flooring, and such additional partition as may be desired; the doors and windows, together with other fittings, being appropriately applied.

To form vertical grooves, in the inner surface of the poured walls, for the reception of partition members and whereby to facilitate location and mounting of the latter, form strips (not shown) may be initially applied to the outside of the inner form at the selected points corresponding to proposed end positions of said members.

The described house form assembly is of metal construction in its substantial entirety; the side and end walls of both the outer and inner forms, together with the roof plates of the form sections 37, being of sheet metal, which produces a relatively fine texture on the wall and ceiling surfaces of the house as produced in the assembly.

It will be obvious that the tractor propelled yoke may serve in connection with a plurality of outer and inner form assemblies, so that a number of houses may be under construction at the same time, yet requiring only the use of the single tractor propelled yoke. Monolithic concrete houses as constructed by means of the described house form assembly are inexpensive, yet very durable, practical, and weather tight.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A device for the transport of cast houses and the like, comprising a mobile frame which includes laterally spaced apart side beams, an end beam connecting the side beams at one end, wheels supporting the side and end beams, a pair of spaced apart vertically upstanding side lift plates disposed adjacent the insides of the side beams, vertically upstanding end lift plates connected to the ends of said side plates at substantially right angles thereto, block and tackle units supported on the side and end beams, each unit including cable runs extending from the unit between the side and end plates and the adjacent beams and connected in lifting relation to the bottoms of the plates, and means to operate the block and tackle units; each plate being offset outwardly along its upper edge to form an inwardly projecting lifting ledge.

2. A device as in claim 1 in which the lift plates are relatively thin, and a reinforcing box beam being disposed along upper and lower edges of each plate, the cables being connected with the lower box beams.

3. A device as in claim 1 in which the side and end plates are shiftable outwardly of each other while remaining in generally symmetrical right angle relation to each other.

4. A device as in claim 1 in which each block and tackle unit includes a swing frame mounted on a horizontal axis on one of the beams and projecting upwardly therefrom, the cable blocks being supported in the upper end of said frame.

5. A device as in claim 4 in which the distance between the ground and the upper ends of the swing frames is greater than the height of the lift plates.

6. A device as in claim 4 including a guy-bar connected between the upper end of each swing frame and the beam.

7. A device as in claim 6 including manually operated means for adjusting the length of the guy bars.

ROBERT G. LE TOURNEAU.

REFERENCES CITED

The following references are of record in the file of this patent:

UNITED STATES PATENTS

| Number | Name | Date |
|---|---|---|
| 844,235 | Besser | Feb. 12, 1907 |
| 881,224 | Carmichael | Mar. 10, 1908 |
| 1,013,251 | Witthoefft | Jan. 2, 1912 |
| 1,365,983 | Guasch | Jan. 18, 1921 |
| 1,983,758 | Hick | Dec. 11, 1934 |
| 2,156,424 | Barnard | May 2, 1939 |
| 2,228,123 | McMurray | Jan. 7, 1941 |
| 2,240,564 | Le Tourneau | May 6, 1941 |
| 2,307,678 | Hayes | Jan. 5, 1943 |
| 2,316,938 | Dimick | Apr. 20, 1943 |
| 2,324,554 | Billner | July 20, 1943 |